Jan. 31, 1967             H. E. JONES             3,302,109
APPARATUS AND METHOD FOR TESTING LOGIC CIRCUITS AND THE
LIKE BY THE COMPARISON OF TEST OUTPUT PATTERNS
WITH PRE-PROGRAMMED STANDARD PATTERNS

Filed Dec. 12, 1962                          5 Sheets-Sheet 1

INVENTOR
HAROLD E. JONES
BY Donald R. Campbell
ATTORNEY

Jan. 31, 1967  H. E. JONES  3,302,109
APPARATUS AND METHOD FOR TESTING LOGIC CIRCUITS AND THE
LIKE BY THE COMPARISON OF TEST OUTPUT PATTERNS
WITH PRE-PROGRAMMED STANDARD PATTERNS
Filed Dec. 12, 1962  5 Sheets-Sheet 4

United States Patent Office 3,302,109
Patented Jan. 31, 1967

3,302,109
APPARATUS AND METHOD FOR TESTING LOGIC CIRCUITS AND THE LIKE BY THE COMPARISON OF TEST OUTPUT PATTERNS WITH PRE-PROGRAMMED STANDARD PATTERNS
Harold E. Jones, Endicott, N.Y., assignor to International Business Machines Corporation, New York, N.Y., a corporation of New York
Filed Dec. 12, 1962, Ser. No. 244,153
10 Claims. (Cl. 324—73)

This invention relates to logic testers, and more particularly to a high speed automatic tester for testing logic circuits on for instance high density printed circuit boards.

High density electronic packaging systems have made obsolete previously used methods of testing logic circuits of the type used in large quantities in data processing and computer applications. Logic circuits packaged on non-high density modular printed circuit boards of the general type shown in U.S. Patent No. 3,008,113 to A. H. Johnson granted November 7, 1961, can be conveniently tested by an unskilled operator by applying all logical input combinations and checking for the proper output voltages. Faculty components are located by the unskilled operator using standard techniques. With the advent of high density printed circuit boards and micromodules and the like, the number of logical input combinations and required tests so greatly increases that operator deduction of faculty components becomes impractical.

Accordingly, an object of the invention is to provide a generally improved and more satisfactory tester for sequentially and automatically making a series of tests on logic circuits and for providing indications of faulty operations.

Another object is the provision of a new and improved testing machine for making a complete test of the operability of one or more logic circuits and for printing out the identification of faculty components.

Yet another object is to provide a new and improved logic tester enabling the rapid and accurate testing of high density packages of electronic logic circuits by an unskilled operator.

A further object of the invention is to provide a generally improved method of testing complex logic circuits and printing out the results.

A still further object is the provision of a new and improved method of inexpensively and rapidly testing high density printed circuit boards or the like containing logic circuits.

In accordance with the invention, each logic circuit output is tested individually by applying all minimized logical input combinations that affect the particular output. In addition to checking whether the correct binary logical 1 or logical 0 is obtained, it is possible to check whether the voltage swings are excessive or insufficient, since this kind of result indicates a different type of fault. For each test there is a single Go or No Go result.

Tests are programmed automatically by punched cards which contain instructions for applying various input drivers, loads and output voltage level detectors to the logic circuit being tested. The test printed circuit board is plugged into a receptacle having connection with a program board for routing the drivers and loads to the particular output and input terminals on the printed circuit board and for modifying the drivers according to the particular logic family being used.

During a test mode of the machine, the Go or No Go result of each test is placed in a magnetic core storage memory, there being at least one core for each test performed. A recirculating type of card reader is used so that testing proceeds automatically and sequentially. At the end of a series of tests, the core memory will have a Go and No Go pattern corresponding to the test results, and each test result will be in a locatable position. If any No Go results have been recorded, the machine now goes into an analysis mode.

An analysis deck of punched cards is provided, each having a Go and No Go pattern representing the pattern of Go's and No Go's that would be stored in core memory for the failure of a particular component or logic block (group of components). As the analysis cards pass through the card reader, the core memory is scanned. When an analysis card is found having a pattern matching the pattern in core memory, then the analysis information and instructions to the operator are printed out on an electric typewriter or the like from a print section on the analysis card.

If more than one component or logic block is faulty, then a "one for one" correspondence of Go's and No Go's between the pattern in core memory and a punched card would not be likely to exist since an analysis card pattern has only the No Go punches that would be caused by a single component or logic block failure. Hence, two types of compare are provided. The first is an "exclusive compare," that is a "one for one" correspondence between Go's and No Go's in core memory and the analysis card such as would occur for a single component or logic block failure. An "exclusive compare" causes the analysis information to be printed out in red, and the operator knows that this particular component is bad. The second type of compare is "partial compare" which checks Go's and No Go's in memory against those on the analysis card but allows additional No Go's to exist in core memory. The additional No Go's in memory are allowed since these could be caused by additional component or logic block failures on the same printed circuit board. The analysis information from "partial compares" is printed out in black, and the operator knows that these components should be checked individually since at least one, but not necessarily all, are bad.

The foregoing and other objects, features and advantages of the invention will be apparent from the following more particular description of a preferred embodiment of the invention, as illustrated in the accompanying drawings, wherein.

*Introduction to theory*

Before proceeding to a detailed description, the general testing method to be followed and the equipment making up the logic tester will be reviewed briefly. The present logic tester automatically tests at high speed a variety of logical circuits to determine if the circuit is performing satisfactorily and whether there are any defective components. A variety of logical circuits may be tested, including the usual combinational logic circuits which perform AND, OR, NOR, NAND, EXCLUSIVE OR, and the like logical functions. In addition, sequential logical circuits such as latches, single shots, oscillators, etc., may be tested. Because of its high speed operation, the tester is especially useful for testing complex and cascaded logic circuits.

Broadly speaking, the testing method comprises checking each logical circuit output individually by applying all minimized logical input combinations that affect the particular output. Additionally, other special tests may be made to test for excessive voltage swings, to apply loads to outputs, and to check the land patterns and jumper wires on a printed circuit package (if used) for opens and shorts. A series of tests is programmed for each circuit to determine the identity of any faulty component, and the results are printed out so that an unskilled operator may deduce the faulty component and replace it. A defective printed circuit board land pattern or a solder short or a jumper wire may be considered to be a faulty component. The tester is particularly useful where the logic circuits are provided in high density packages, where the number of logical input combinations and required tests so greatly increases that operator detection of the faulty components, without the aid of the machine, becomes impractical.

Figure 1:
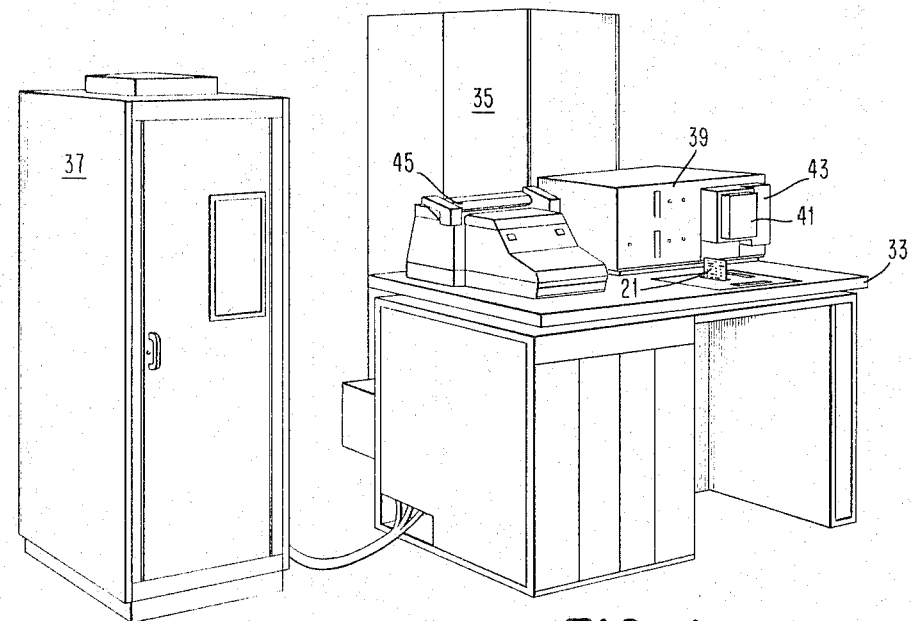
FIG. 1 is a perspective view of the physical appearance of the main units of the automatic logic tester.
Figure 2:
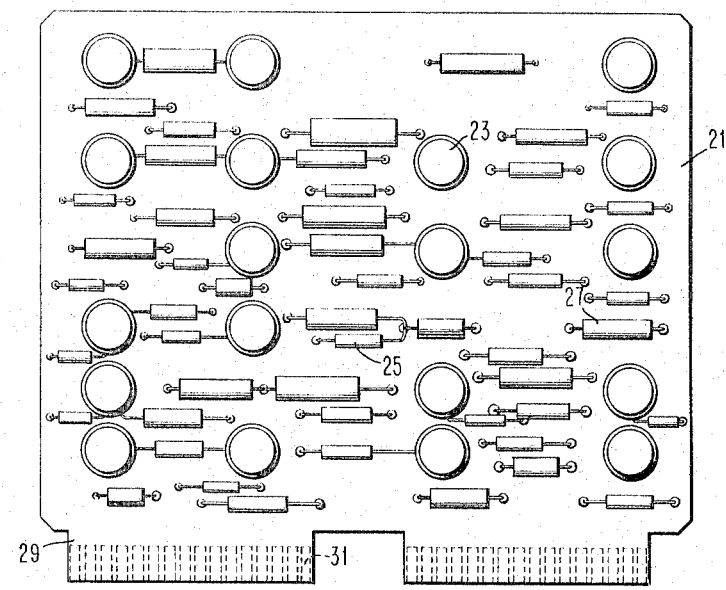
FIG. 2 is a plan view of a high density printed circuit board containing logic circuits to be tested.

Referring to FIGS. 1 and 2, there is shown a printed circuit board 21 of the plug in type commonly used in data processing machines and computers. This is a typical high density package containing one or more logical circuits which can be conveniently tested by the present machine. The printed circuit board or test board 21 contains transistors 23, diodes 25, and resistive and capacitive elements 27, interconnected to form various logical circuits by printed circuit lines on the back of the board. The bottom of the board 21 has two tabs 29, each having sixteen pins or terminal areas 31 for connection to the inputs and outputs of each logical circuit and to the various supply voltages and ground voltage required by the active components. The printed circuit board 21 is generally of the type described in the aforementioned Johnson Patent 3,008,113, but contains four times as much circuitry although it is physically only twice as large.

The main units of the tester as shown in FIG. 1 are a console unit 33, an auxiliary cube 35, and a card reader 37. The console 33 has a socket or receptacle on the table top to which the printed circuit board 21 is plugged. A control panel 39 provides visual indicia of various kinds, and contains switches for manual setting. In making a test, a driver is connected to each of the inputs of the logical circuit and, if desired, a load can be connected to the output of the circuit. In addition, it is necessary to apply various supply and ground voltages. A level detector is also connected to the output of the circuit to evaluate whether the proper voltage output or voltage swing is being produced by the circuit when the drivers are applied. A program board 41 in the form of a pin board is provided to facilitate the connection of the desired drivers, loads, supply voltages and level detectors, to the pins 31 on the test board 21. Of course, the program board 41 is electrically coupled with the terminals in the socket into which the printed circuit board 21 is plugged. There is also on the console unit 33 a master program board 43 which can be set up for the particular type of logic being tested to modify the driver loads to produce the proper voltage swings. The tester has a plurality of drivers, loads and power supplies which can be selectively connected with the program board 41 according to the requirements of the particular logical circuit being tested. There is one program board 41 for each different printed circuit board 21 which is to be tested.

The voltage output level of each logical circuit can be checked not only for a logical 1 or logical 0, but also for an excessive swing, whether too positive or too negative, since this indicates a different type of fault. For this reason, four types of level detectors are used. One is an insufficient positive level detector which checks for a logic 1; a second is an excessive positive level detector which checks for an excessive logic 1. The third type is an insufficient negative level detector which checks for a logic 0 and the fourth is an excessive negative level detector which checks for an excessive logic 0. The result of each test, as detected by the level detector, produces a Go or No Go result to indicate whether the circuit is performing satisfactorily or unsatisfactorily.

The card reader 37 operates on two decks of record cards known as the test deck and the analysis deck. The test deck contains a punched card for each test to be performed, and provides for the selection of the particular drivers, loads and level detector required by the particular test. The card is read by the card reader and the data is supplied to the appropriate portions of the tester in the console unit 33 and the auxiliary cube 35. The result of each test produces Go or No Go indication which, at the proper time in the operating cycle of the tester, is written into a magnetic core memory. The core memory comprises a magnetizable core element for each test which has one polarity for a Go result and the opposite polarity for a No Go result. In its basic form, the cores are all placed in Go state and only the No Go's are written into storage corresponding to the results of the various tests. By writing in No Go's in a predetermined sequence, the result of any particular test can be read out by addressing that core.

The analysis deck contains a punched card for each component or logic block on the test board. Each card has the Go, No Go pattern which would result for a failure of a particular component or logic block. As the analysis cards pass through the card reader, the core memory in the tester is scanned and the pattern on the punched analysis card is compared with the pattern of Go's and No Go's in the core memory. A faulty component or logic block is indicated when an analysis card is found having a Go, No Go pattern that matches the pattern in core memory. Analysis information is printed out on a printer 45 from a print section of that analysis card.

Two types of compare are provided. This is because if more than one component or logic block is faulty, then a "one for one" correspondence of Go's and No Go's between the pattern in core memory and an analysis card would not be likely to exist, since the punched analysis card pattern has only the No Go punches that would be caused for a single component or logic block failure. The first is "exclusive compare," that is a "one for one" correspondence between Go's and No Go's in core memory and on the analysis card such as would occur for a single component or logic block failure. An "exclusive compare" causes the analysis information to be printed out in red. The second type of compare is a "partial compare" which compares Go's and No Go's in memory against those on the analysis card, but allows additional No Go's to exist in core memory. The additional No Go's in memory are allowed since these could be caused by additional component or logic block failures on the same printed circuit board. The analysis information from "partial compare" is printed out in black. Using the printed out information, the operator can easily identify the faulty components and replace them.

*Sample test logic circuit*

Figure 4:
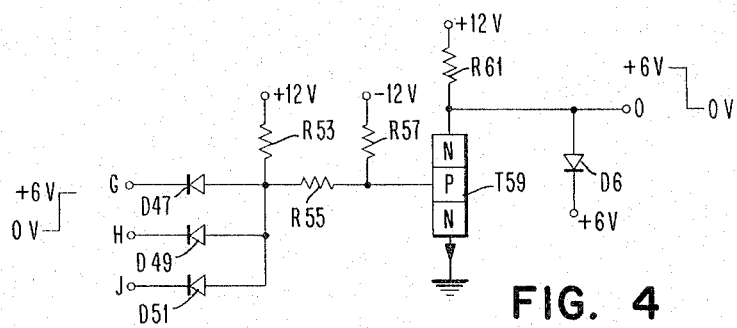
FIG. 4 is a schematic diagram of a simple logic test circuit which provides an easily understood example.

In FIG. 4 is shown a typical logic circuit which can be tested for performance and faulty components using the method and logic tester according to the invention. The sample circuit is known as a three-way plus AND invert circuit. The circuit comprises three input diodes D47, D49, and D51, which have their cathodes connected respectively to outputs G, H, and J. The anodes of the input diodes are connected together and returned to a bias of +12 v. through resistance R53. A voltage divider comprising resistors R55 and R57 is referenced to a potential of −12 v., and the tap between these two resistors is coupled with the base of a P type transistor T59. The other end of the resistor R55 is tapped between R53 and the anodes of the three input diodes. Transistor T59 is connected in the common emitter configuration with its emitter returned to ground and its collector connected to a voltage of +12 v. through a load resistor R61. A collector clamp D63 has its cathode referenced to +6 v. and its anode connected to the collector of transistor T59. The output 0 is taken off between these two points.

In order to check this three-way AND invert circuit, the tester must perform four logic tests and three special tests that determine which component has failed. These tests are:

(a) One test to check the AND function.
(b) Three tests on the inputs to check the OR function of the circuit.
(c) All inputs in the zero condition which pin points the analysis for the input voltage divider network.
(d) A test on the output to check the clamp diode which, in this case, is an excessive positive test.
(e) A negative load switch test.

To understand these tests it should be realized that a +6 v. input is considered to be a logic 1 and that a zero volts input is considered to be a logic 0. Similarly, an output voltage of +6 v. indicates a logic 1 and 0 v. indicates a logic 0. Test (a) checks the AND function by applying +6 v. to each of the inputs G, H, and J, which causes the tap of the input voltage divider to become positive, turning on transistor T59 and causing the output 0 to go to 0 v. This checks whether the transistor is open, the series resistor R55 in the voltage divider, and resistor R53 to the +12 v. which is the reference for the diodes. Test (b) comprises applying 0 v. to each input separately and, in each case, the transistor T59 should not turn on and there should be a +6 v. output. This assures that the transistor is not shorted and that the base resistor R57 is present. In test (c) 0 v. is applied to each of the inputs simultaneously, and the transistor T59 should not turn on since the tap between the series input voltage divider should remain negative. This tests the input voltage divider network. The clamp diode in test (d) is checked by an excessive positive test by, for instance, determining that the output does not rise above +7 v. The negative load switch test, according to test (e), involves connecting a load to the output 0 which is returned to a negative voltage to determine if the collector resistor R61 is missing or is too large, since the output in that case goes below +6 v., and the positive level detector is not satisfied. By each of these tests, or a combination of tests, each component in the three-way plus AND invert logic circuit of FIG. 4 can be checked, and the faulty component or components determined if one or more of the tests is No Go.

To test the circuit, it is not necessary to use all logic input combinations, i.e., $2^3$ input combinations. Selected input combinations are chosen (these are referred to as all minimized input combinations) which provide test results which can be used in combination to determine the identity of selected faulty components. In general, something less than the maximum number of input combinations are required to test a logic circuit. The number of tests needed is determined by the ability to isolate the particular component or logic block whose failure is being analyzed.

*Detailed description*

Figure 3:
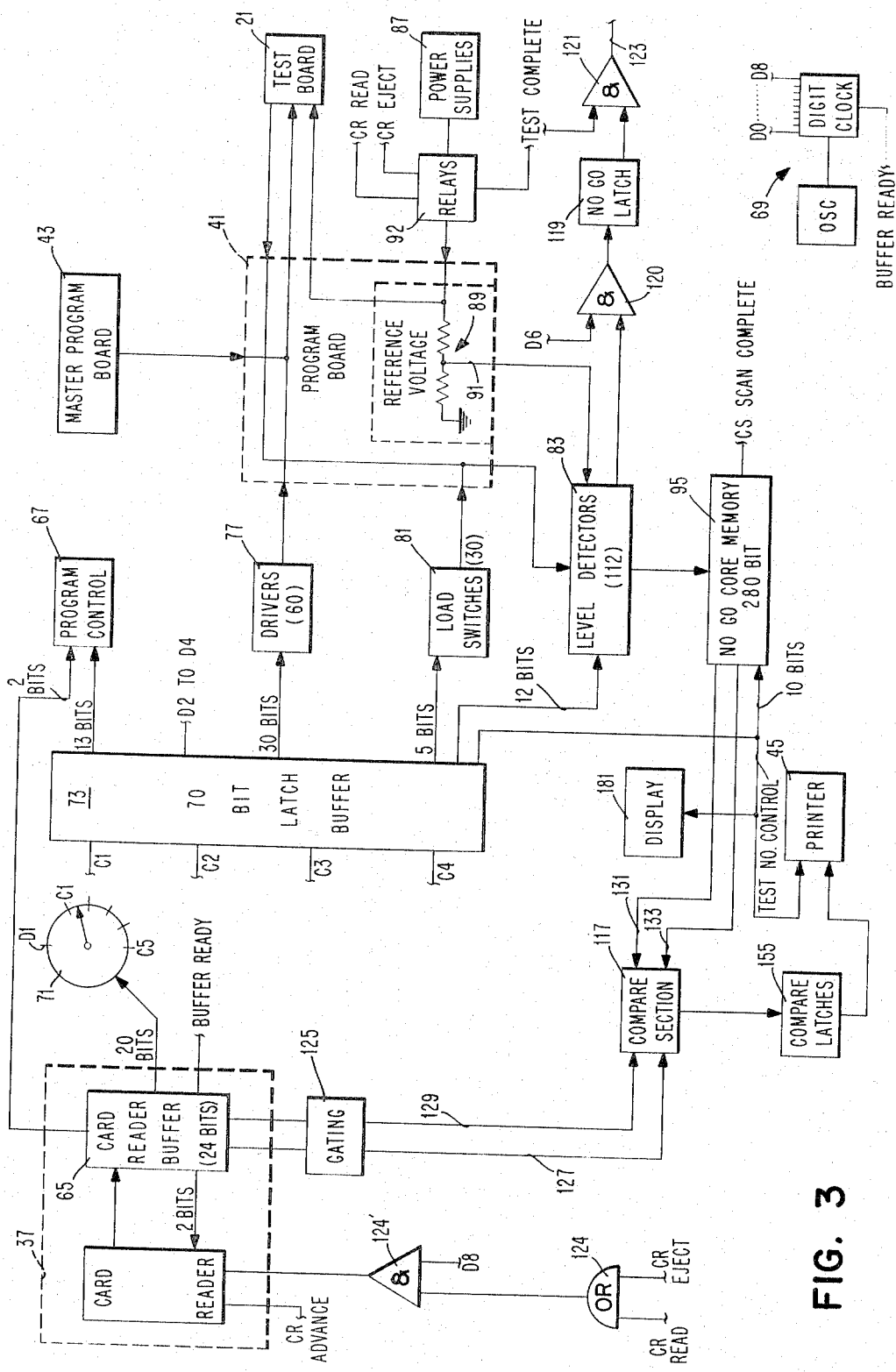
FIG. 3 is a simplified schematic block diagram of the various operative parts of the tester and the flow of data and information therethrough.

Referring to FIG. 3, the card reader 37 is a serial card reader of the automatically recirculating type which reads two columns at a time. The test deck and the analysis deck are put in the proper order and placed one upon the other in the hopper. The first card is fed into a read station where the first two columns of punched information are read simultaneously, then the card is advanced automatically so that the second pair of columns can be read, and so on. The reading operation may be, interrupted at any desired time, and after all the information on the card has been read it can be ejected and the next card fed into the read station. The cards are read serially, one by one, starting with the test deck and going on to the analysis deck as the test proceeds. The card reader 37 is preferably an IBM type 1939 recirculating serial card reader, and further information on this card reader can be obtained fom the co-pending patent application S.N. 79,049, filed December 28, 1960, by H. R. Clarke and entitled "Programming Apparatus" (assigned to the same assignee as the present invention) on which U.S. Patent No. 3,088,666 was granted May 7, 1963; and from patent No. 3,026,531 to H. R. Clarke dated November 6, 1962, and entitled "Form Handling Apparatus."

The punched record card used by the card reader 37 is a conventional card (see FIG. 5) having twelve rows down and 80 columns across. It will be understood that the card reader reads columns 1 and 2, advances and reads columns 3 and 4, then advances again to read columns 5 and 6, etc. Thus, 24 bits of information are read at one time. The twelfth row on the punched cards is reserved to indicate to the tester the start of a new test and whether the card being read is an analysis or test card. The eleventh row on all cards is reserved for odd parity punches which are required by the card reader and, therefore, are not used in the tester. The remaining rows 0 through 9 contain punched information as to the particular test being carried out. All of the punched information is read into a card reader buffer 65, which is a conventional latch buffer and is described in the aforegoing application. The two bits from the twelfth row of the cards go into a program control section 67 of the tester.

The sequence of operations of the logic tester are controlled by a digit clock of conventional construction such as is indicated schematically at 69. The digit clock 69 supplies equally timed clock pulses D0 through D8 which are applied to various portions of the tester to assure appropriate timing. Upon the start of a new test, the digit clock is turned on by the filling up of the card reader buffer 65 and the appearance of the buffer ready signal. When the digit clock advances to D1, a column counter 71 is reset.

The column counter 71 gates the remaining 20 bits stored in the card reader buffer 65 to the proper section of a 70-bit latch buffer 73. As many as 70 bits of information may be required to program one test. At the time C1 on the column counter, the first 20 bits of information are gated into the first 20 latches of the latch buffer 73. The card reader 37 in the meantime has advanced to read the next two columns which are stored in the card reader buffer 65, and those 20 bits of test information are gated by the column counter 71 at time C2 into the next 20 latches of the latch buffer 73. At C3 the next 20 bits are stored in latches 40–59, and at time C4 the remaining ten latches are set according to whether or not there is a punched hole in the record card. Filling up of the latch buffer 73 occurs digit times D2 to D4. Digit D5 is a waiting time. The latch buffer 73 is a conventional "set-over-reset" type of latch buffer.

Of the 70 bits put into the latch buffer 73, thirteen bits go to the program control section 67. In the program control 67, the various modes of operation of the tester are set up. For instance, if a printed circuit board 21 includes a single shot, it will be necessary to make an oscilloscope test. In this case, the tester is stopped at the end of digit time D5, the oscilloscope test is made by the operator, and the Go or No Go results are entered manually into the core memory by means of switches on the control panel 39. Another possible mode of operation is a single cycle mode in which the tester is stopped at the end of one test rather than automatically going on to the next test as in the normal mode. Another possible mode of operation is to stop the tester whenever a No Go is recorded. Only the normal mode of operation of the logical tester will be described herein, and this involves automatically testing the entire printed circuit board 21 and printing out the faulty components which may be found.

Another 30 bits from the latch buffer 73 are used to connect selected ones of 60 drivers 77 to the input pins on the printed circuit board 21 through the program board 41. Both negative and positive drivers can be used. Although detailed information as to the nature of the master program board 43 is not thought to be necessary to an understanding of the basic form of the invention, it will be noticed that broadly speaking the master program board modifies the drivers by applying different loads for the different logic families to control the voltage swings.

Another five bits from the latch buffer 73 are transmitted in BCD code through a decoder not here shown and are used to select the proper one of 30 load switches 81. The output from the load switches 81 is plugged into the program board 41 to interconnect with the line from the output pin of the logic circuit being tested on the circuit board 21. Both of these lines, in turn, are coupled with the line leading to the level detectors 83.

A total of 112 level detectors are provided, and these include 28 insufficient positive level detectors (IPLD's), 28 excess positive level detectors (EPLD's), 28 insufficient negative level detectors (INLD's), and 28 excessive negative level detectors (ENLD's). Selection of the desired level detector is obtained by means of twelve bits from the latch buffer 73 which originally are in BCD code.

A plurality of standard power supplies 87 are provided and are plugged into the program board 41 and connected through the program board to the proper tab pins on the test board 21. There are also two variable power supplies for programming voltages between 0 v. and 100 v. The voltage from a desired one or ones of the power supplies 87 is also connected to one end of a voltage divider 89, the other end of which is grounded. A tap 91 from the voltage divider 89 provides the desired reference to be applied to the level detectors 83 for a purpose to be explained later. Generally speaking, a No Go test result exists if the output voltage from the test circuit is greater than the reference voltage when testing for an insufficient negative voltage or excessive positive voltage and less than the reference voltage when testing for an insufficient positive or excessive negative voltage. By means of a conventional relay arrangement 92, plugging the test board 21 into the test socket on the console 33 automatically causes the relays to close in the desired sequence to apply the desired supply voltages to the board being tested.

The remaining ten latches of the 70 bit latch bit buffer 73 contain ten bits of information as to the test number being made, and are transmitted to the core memory 95. The test number provides the address for the core in the core memory corresponding to the test being made, while the level detectors 83 supply the Go or No Go result which is the data to be entered into the core memory at the location specified by the test number address. The number of tests which can be performed on the test board 21 is limited by the number of cores making up the core memory 95, inasmuch as there must be at least one core for each test. The present tester utilizes two core planes of 140 cores each in an array of ten rows by fourteen columns, so that a total of 280 tests is possible. Of course, if additional tests are required, it is possible to schedule the test to a convenient break-off point and then complete the test from new decks of test and analysis cards after having made the proper replacement of the program board 41.

Figure 5:
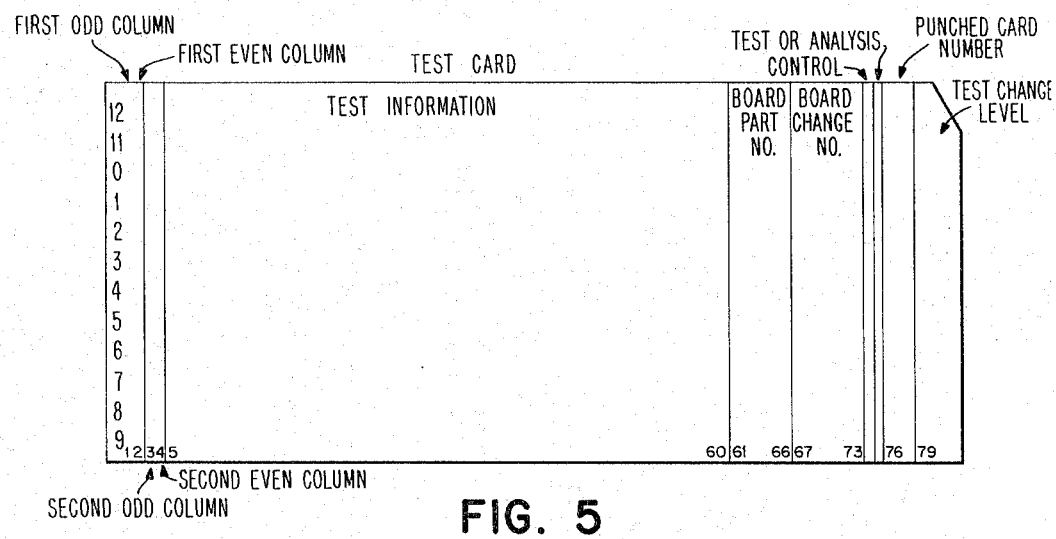
FIGS. 5 and 6 show respectively a test card and an analysis card with the fields in which information is to be entered separated and identified.

The test card format is illustrated schematically in FIG. 5. Test information is entered into columns 1 to 60, using the first odd and even columns, then the second odd and even columns, and so on, since the card reader 37 reads two columns at a time. In columns 61 to 66 is entered the number of the printed circuit board 21, while columns 67 to 73 are used for the engineering change number. Machine control information is entered into column 74. Column 75 is used to indicate if the card is a test or analysis card. Columns 76 to 78 give the punched card number, and columns 79 and 80 give the punched card change level. The format used in entering test information into columns 1–8 on the punched test cards is as follows. If other tests are to be included on the same test card, the format is repeated for the remaining columns. One test may require 4, 6 or 8 columns of information.

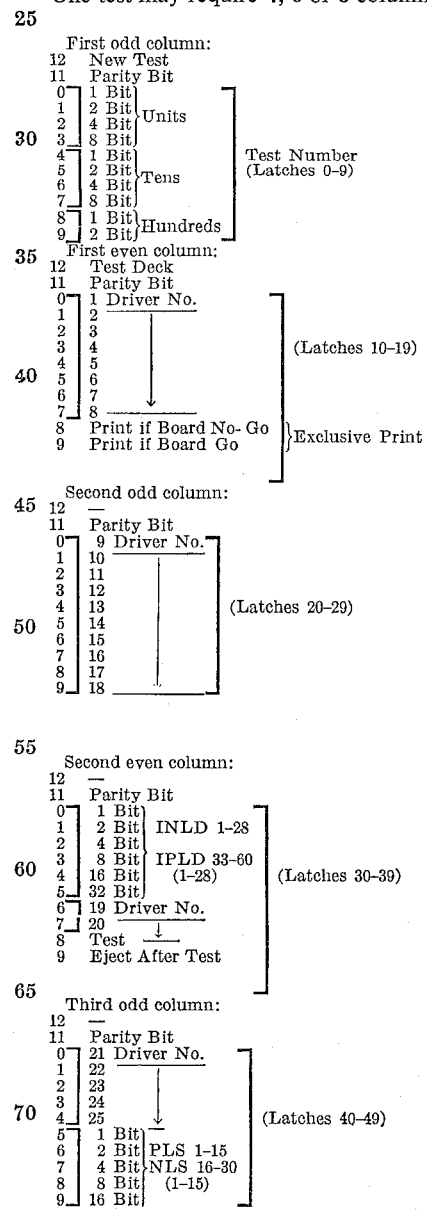

Third even column:
```
12  —
11  Parity Bit
 0⎤   1 Bit⎫
 1 |  2 Bit | ENLD 1-28
 2 |  4 Bit |
 3 |  8 Bit⎮ EPLD 33-60       (Latches 50-59)
 4 | 16 Bit |    (1-28)
 5⎦  32 Bit⎭
 6   Print if Single Test No Go
 7   Print if Single Test Go
 8   Test
 9   Eject After Test
```

Fourth odd column:
```
12  —
11  Parity Bit
 0⎤  26 Driver No.  ⎤
 1 | 27              |
 2 | 28              ↓
 3 | 29
 4⎦ 30              ⎦   (Latches 60-69)
 5   Scope Test
 6⎤   1 Bit    OSC.
 7 |  2 Bit    Drivers
 8⎦  4 Bit    1-7
 9   Eject After Test
```

Fourth even column:
```
12  —
11  Parity Bit
 0⎤  31 Driver
 1 | 32 Driver
 2 |
 3 | Spare
 4 | (No Latches)
 5 |
 6 |
 7 |
 8 |
 9⎦
```

In the above it will be noted that the twelve row of the first odd column is punched to indicate a new test. In the first even column, rows 8 and 9, is an instruction as to a type of program control to print if the test board is No Go or to print if the board is Go. Punching both results in an exclusive print (i.e., print everything on the card). In the third even column, rows 6 and 7, is an instruction for the type of program control to print if a single test is No Go or to print if a single test is Go. The second or third even column, row 8, is punched if the test is a logic test to be made automatically by the tester rather than a scope test. If a scope test is be made, the fourth odd column, row 5, is punched and the oscillator driver which may be required is entered into rows 6, 7 and 8. The "eject after test" in row 8 of the second even column, the third even column, and the fourth odd column, is punched if the card is to be ejected from the card reader 37 following the completion of that test. Otherwise the card reader advances automatically to read the next two columns.

Figure 6:
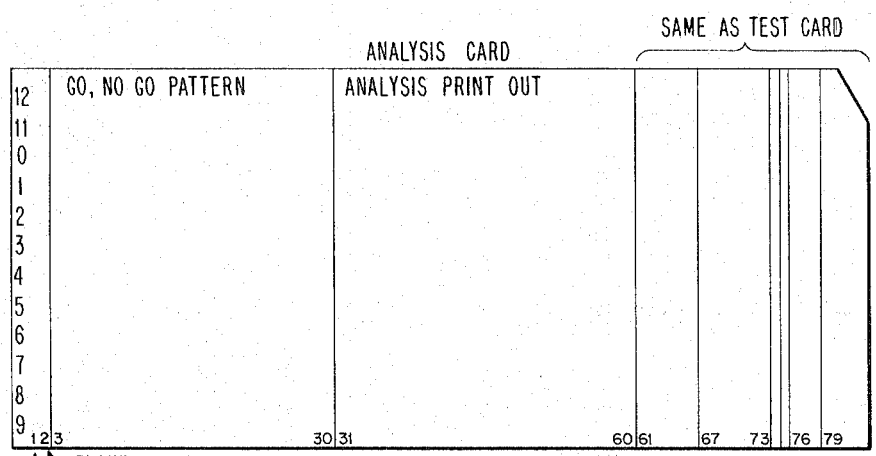

The format for the analysis cards is shown in FIG. 6. Column 1 is for the analysis number while column 2 is blank. In columns 3 to 30 is entered the Go and No Go pattern of tests which would result if a particular component or logic block is faulty. The analysis print-out information to be transmitted to the printer 45 is contained in columns 31 to 60. For instance, if the pattern of No Go's in columns 3 to 30 indicates the failure of say resistor R45, the analysis print-out section will direct the printer to print out R45. Columns 61 to 80 have the same format as the corresponding columns on the test card.

Figure 7:
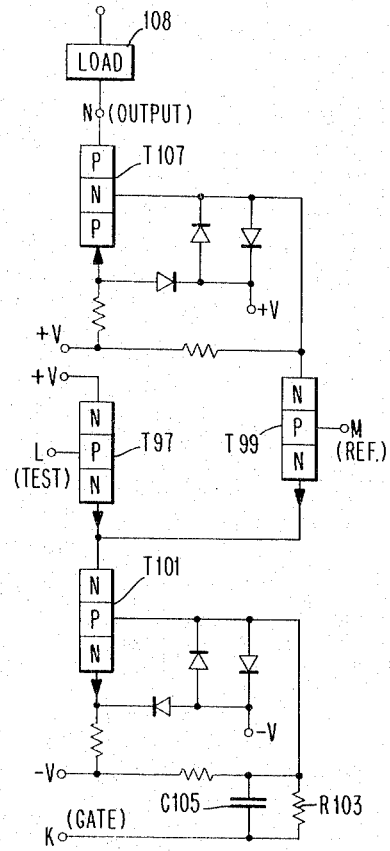
FIG. 7 is a schematic circuit diagram of a positive level detector.

A sample one of the level detectors 83 is shown in FIG. 7. This circuit is a positive level detector. The test or unknown voltage resulting from the logic circuit test is connected to input L, which input is coupled with the base of a P type transistor T97. The reference voltage obtained from the voltage divider 89 is connected to the input M, this input being coupled with the base of a P type transistor T99. The emitters of these two transistors are tied together and to the collector of another P type transistor T101. The output from the appropriate set of latches of the 70-bit latch buffers 73 is applied to the pin K and acts as a gate for the level detector in the manner to be explained later. The pin K is coupled through the parallel combination of resistor R103 and capacitor C105 to the base of the transistor T101. The collector of transistor T99 is coupled with the base of an N type transistor T107. The output appears at the pin N off of the collector of the transistor T107. This output is connected with an appropriate load card 108 for limiting the swing between —12 v. and 0 v. When the output from the load card is —12 v., the test is a Go; and when the output of the load card goes to 0 v., this indicates an error and the result is No Go.

Appropriate supply voltages are shown for the various transistors, as well as diode configurations between the base and emitter of transistors T107 and T101 which operate in conventional manner. As has been explained, the pin K is essentially a gate and the circuit is off if this pin is at —12 v., and is on when a ground voltage is applied to the pin K. When ground voltage is applied to pin K, the base of transistor T101 tends to raise or the transistor tends toward turn-on. The collector of T101 tends to swing up or down depending on the relative voltages at pins L and M. If the test voltage is more positive (say +6 v.) than the reference voltage (say +5.5 v.), transistor T99 tends to turn off, and this allows transistor T107 also to tend to turn-off. The output off the collector of transistor T107, after passing through an appropriate load, is at —12 v. indicating a Go for the test. If, on the other hand, the unknown voltage at pin L (say 0 v.) is less than the positive reference voltage at pin M, this tends to forward bias transistor T99 and current flow through the transistor turns to draw the collector down. This tends to turn on T107, thus increasing the collector voltage, and the output after going through the appropriate load goes up to 0 v., indicating an error or a No Go condition.

Figure 8:
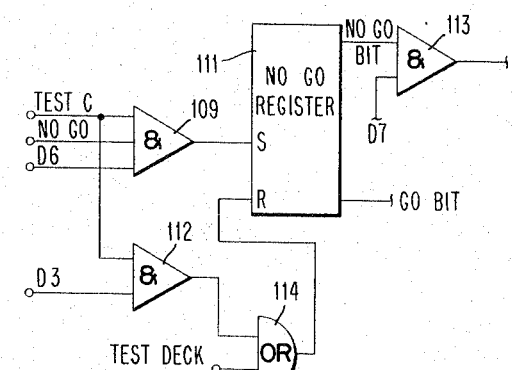
FIG. 8 is a schematic diagram of the No Go register.

In FIG. 8 is shown a simplified schematic of a circuit for receiving the No Go bits from the level detectors 83 and for storing them before being gated out at D7 time to the core memory 95. The coincidence of a No Go and D6 time in addition to a test card signal (which comes from the punched card) are required in order to gate through AND circuit 109 to set a No Go register 111. At D7 time and the AND circuit 113 turns on and transmits the No Go bit to core memory. The No Go register 111 is more particularly a latch which can be reset by a test deck first card signal being conducted through an OR circuit 114, in which case a Go bit is produced at the output of the latch. It will be recalled that the test deck first card signal is obtained by punching row 12 of column 1 (and also test 0) of the first test card. This resetting the latch 111 at the start of each new series of tests is used to assure that all the cores in the core memory 95 are in the same (Go) state. The core memory 95 includes a conventional arrangement for scanning all of the cores at this time to make sure that they are all set in the same sense, corresponding to a Go test result. The latch 111 is also reset at the start of each test made on the same test board 21. For this purpose, the test card (test C) signal is gated through AND circuit 112 at D3 time, thereby turning on OR circuit 114.

The core memory 95 (FIG. 9) is made up of two planes of magnetic cores 115 arranged in rows and columns like the rows and columns of a punched record card. There is one core 115 for storing the results of each of the logic tests which are made on the test board 21. The core planes partially shown schematically in FIG. 9 each contain 140 cores arranged in 14 columns across and 10 rows down. The results of tests 00–09 are placed in column 1 of the upper core plane as shown by the small numbers applied to the various cores (core 00 is an extra core and is not used). The results of tests 10–19 are stored in column 1 of the bottom core plane. In general, it can be said that the upper core plane contains the even tens test results (test 01 is considered to be an even tens test) and that the odd tens test results are stored in the bottom core plane. Assuming that all the magnetic cores 115 are in the Go magnetic state at the beginning of the test, a No Go test result is stored by causing that particular magnetic core to switch states.

The core memory 95 uses conventional apparatus and operates in a manner well-known in the art. Although a detailed description of the core memory will not be given, the basic principles of the operation of a core storage memory will be briefly reviewed. A ferrite core is a bi-stable storage device. The ferromagnetic properties of the core permit it to be magnetized by applying an external magnetizing force. After the core is magnetized, it retains the magnetic flux even though the magnetizing force is removed. It may be magnetized in either a north-to-south or a south-to-north direction in much the same way that a trigger can be set in two states; hence, the term bi-stable. The operation of writing into core storage involves recording the test results into the core corresponding to the particular test. In a manner well-known in the art, the coincidence of an X-line current and a Y-line current are required to write into a core, and at the same time it is necessary that the inhibit line be down. Generally speaking, the X and Y line currents together provide sufficient magnetizing force to switch the core, but when the inhibit line is on the effect of the X-line current is cancelled and the Y-line current alone does not provide enough magnetizing force to switch the core. Briefly referring to FIG. 3, the test number information from the 70 bit latch buffer 73 provides the address to core memory during the writing operation and controls the selection and pulsing of the X and Y lines going through the desired core. The Go and No Go test results obtained from the level detectors 83 and gated by the No Go register 111, control the selection and energization of the inhibit line. Thus, the inhibit line is down when there is a No Go bit, permitting the core to swtch states, and is up when there is a Go bit, in which case the core cannot switch states.

Figure 9:
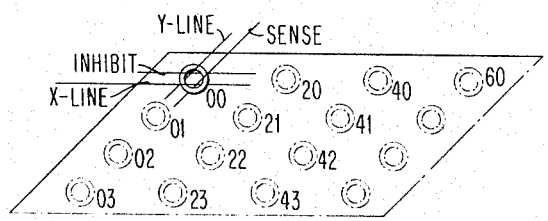
FIG. 9 is a simplified partial schematic view of a core storage memory.

Reading out of core memory involves sensing the information stored in the various cores and transmitting it to the compare section 117 (FIG. 3) of the logic tester. To read out of core memory, it is necessary to have an additional line through each core 115, called the sense line (FIG. 9). In reading out, the X and Y lines are pulsed in the opposite direction from writing in to switch the No Go cores back to the Go state. The change of flux in the magnetic core induces a voltage in the sense wire, which is amplified and stored in a latch in the well-known manner. If the core was originally in a Go state, there is no flux change and no voltage is induced in the sense wire. It is essential that the core memory 95 be a non-destructive type of memory. After the test results stored in core memory are compared with the information on a particular analysis card, the core memory must have the original Go and No Go pattern in order that the comparison with the next analysis card can be made. Thus, it is necessary to write the information read out of each magnetic core back into the core again. As the information is read out of the sense wire latches for transmission to the compare section 117, it is at the same time written back into the core storage.

Figure 10:
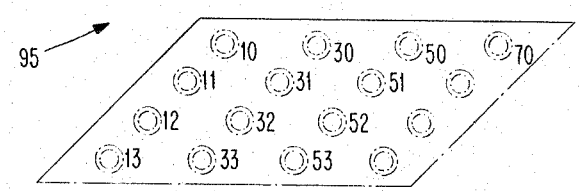
FIG. 10 is a schematic diagram of a memory clock showing the pulses in the memory clock cycle.

A control section of the core memory 95 includes decoders, latches, matrix switches and the like, for causing automatic switching of the information to the cores in sequence during the writing in operation and provides for automatic scanning of core memory during the reading out. The scanning during read out involves going sequentially from one core to the next to read out the information in a selected group of cores. The compare section 117 compares two columns of information on the analysis card with the corresponding information stored in memory. Thus, it is necessary to read out of memory two columns at a time, for instance, tests 01–19 then tests 20–39, and so on. The described cycle of reading and writing for each core is under the control of a core storage clock of the type shown in FIG. 10 at 119. This clock produces R0, R1, W0, W1, inhibit and sample pulses.

The R0, R1, W0, and W1 pulses follow sequentially one upon the other. Reading out of core memory is done at R1 time, and the W1 time is used to write into all cores at that address that have their inhibit lines turned off. The inhibit pulse, of course, begins prior to the W1 pulse and extends throughout its duration. The sample pulse begins prior to the W1 pulse and is turned off in advance of the end of the W1 pulse. The sample pulse is generated while writing back into memory from the sense line latches and samples the information in the latches. As is well-known in the art, the R0 and W0 times are used for resetting and advancing purposes.

A particularly simple description of the operation of a core memory is contained in the copending application of H. E. Eden, S.N. 862,534 filed December 29, 1959, and entitled "Error Checking Device" (assigned to the same assignee as the present invention), on which U.S. Patent No. 3,066,601 was granted on December 4, 1962. Also see U.S. Patents 2,739,300 and 2,939,119.

Before going into analysis mode, it is necessary to sense the completion of the last test. The last test is indicated on a test card by a 12 in the tens position of the test number, i.e., an eight and a four-punch in the first odd column, rows 6 and 7. Referring to FIG. 3, a master No Go latch 119 is set at D6 time (AND circuit 120 conducts) whenever the result of any one test as obtained from the level detectors 83 is a No Go. This No Go signal from No Go latch 119 is gated by an AND circuit 121 when the test complete signal appears. The output 123 of the AND circuit 121 is used to provide a signal which prevents the ejection by the card reader of the first card of the analysis deck. The test complete signal, which derives from punches in the last card of the test deck, is also applied to the relay circuit 92 to initiate disconnection of the power supplies 87 from the test board 21. At the same time the socket on the table of the console unit 33 into which the test board 21 is plugged is released by conventional air operated mechanism so that the test board 21 may be removed. The opening of the relays 92 sends a card reader eject (CR eject) signal to the card reader 37 to cause the card reader to hunt for the first card of the analysis deck at D8 time. More specifically, the CR eject signal causes an OR circuit 124 to conduct and AND circuit 124' conducts when the D8 signal arrives.

The first card of the analysis deck is indicated by punches in column 1, rows 1 and 3. This card is ejected and the next analysis card is automatically moved into the read station of the card reader. It will be recalled that each analysis card contains in columns 3–30 the Go, No Go pattern which would result if one component or logic block on the test board 21 is faulty. There are as many analysis cards as there are possibilities of faulty components according to the tests programmed by the test deck. Each of the punch positions represents a test number. Thus, column 3 contains tests 01 to 09 in rows 1 to 9 respectively; column 4 contains tests 10 to 19 in rows 0 to 9, and so on. There are even column tests (01–09, 20–29, etc.) and odd columns tests (10–19, 30–39, etc.). The Go, No Go pattern for up to 280 tests may be recorded on each analysis card, corresponding to the size of the core memory 95 (which has 280 cores). A No Go test result is indicated by the presence of a punch, whereas a Go result is indicated by the absence of a punch.

In scanning the analysis deck, the first 20 Go's and No Go's on the punched analysis card (corresponding to tests 00–19) are compared with the first 20 Go and No Go test results in core memory (likewise corresponding to tests 00–19). Because two columns of information are read out of the punched card at the same time, and because the core memory test results are in column 1 of each of the core planes, the core memory test 0 result and the test 10 results are compared against the two corresponding tests on the punched card at the same time. Upon the next cycle of the memory clock 119, the core memory test 1 and test 11 results are compared with their corresponding test 1 and 11 bits on the punched card. This operation is repeated for each corresponding group of tests. Assuming that a non-compare is not found, the card reader 37 advances to read the next 20 bits, corresponding to the results of test 20–39, into the card reader buffer 65 ready to be compared with the next 20 bits which will be read out of the core memory 95. The scanning of the analysis cards and the core memory proceeds by 20-test intervals until the last test is reached.

A suitable gating circuit 125 is provided for gating the punched analysis card bits serially from the card reader buffer 65 to the compare section 117 in synchronization with the scanning of the corresponding test bits out of the core memory 95. To understand how this is done, it is necessary to be familiar with the way in which the test results are scanned out of core memory. Briefly referring to FIG. 9, the planes of magnetic cores 115 are scanned by energizing the desired Y-line, which is threaded through at least one column of cores. Then the X-lines through the various cores in that column are energized sequentially and the test results are read out of the cores in the same sequential pattern. To scan the test results of cores 00–19 two bits at a time, as previously described, it is only necessary to thread the same Y-line through the cores in the first column of each of the core planes and to have separate X-lines for each units position, although the same X-line is threaded through corresponding cores in both planes. The punched card bits from the card reader buffer 65 are gated to the compare section 117 more specifically in synchronization with the units scan of the X-lines. Gated odd column bits enter the compare section 117 over conductor 127 and gated even column bits from the analysis card are transmitted over conductor 129, and simultaneously the corresponding odd tens Go and No Go bits from core memory enter the compare section 117 on conductor 131 and corresponding even tens Go and No Go test results from core memory are transmitted over conductor 133.

Figure 11:
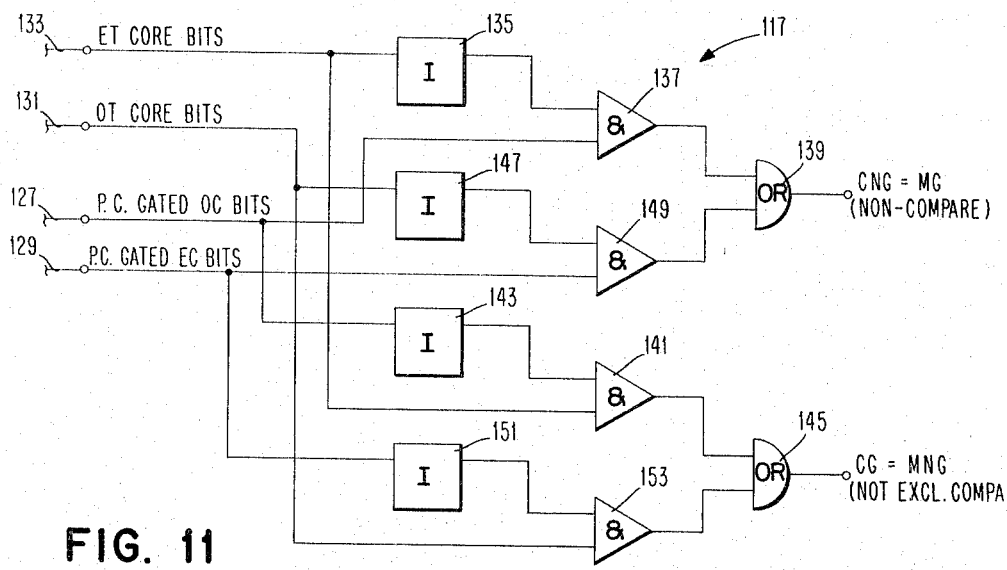
FIG. 11 is a schematic circuit diagram of the compare section of the logic tester.

Before proceeding to a detailed description of the compare section 117 shown in FIG. 11, the comparing method to be followed will be reviewed. As has been mentioned previously, two types of compare are provided known as "exclusive compare" and "partial compare." An analysis card pattern has only the No Go punches that would be caused for a single component or logic block failure. If more than one component or logic block is faulty, then a "one-for-one" correspondence of Go's and No Go's between the pattern in core memory and a punched card would not be likely to exist. "Exclusive compare" is a "one-for-one" correspondence between Go's and No Go's in core memory and the analysis card as would occur for a single component or logic block failure. An "exclusive compare" causes the analysis information to be printed out in red. A "partial compare" checks Go's and No Go's in memory against those on the analysis card, but allows additional No Go's to exist in core memory. The additional No Go's in memory are allowed since these could be caused by additional component or logic block failures on the same printed circuit board being tested. The analysis information from "partial compares" is printed out in black.

There is yet a third type of compare information called non-compare. A non-compare occurs whenever there is a punched card No Go for which the corresponding test results in core memory is a Go. Failures of components or logic blocks is indicated in core memory by a No Go and, of course, if there is a Go result, the components in the circuit tested must be all right. An example will clarify when there is an exclusive compare, a partial compare or a non-compare. Let us say that four tests have been made. If a No Go for tests 1 and 2 indicates the failure of, for instance transistor T3, then an exclusive compare occurs whenever there is a punched analysis card with No Go punches for tests 1 and 2. In this case, the analysis information from the print section of that analysis card, for instance "T3 open," is printed out in red. Because it is in red, the operator knows that the printed out component is definitely bad, and is to be replaced.

As an example of a partial compare, let us say that the tests 1, 2 and 4 produced No Go results. The failure of tests 1 and 2 is due to transistor T3 being open, and the failure of test 4 is caused by, for instance, diode D4 being open. When the analysis card having No Go punches for tests 1 and 2 is scanned, the information will be printed out in black because there is a partial compare. An exclusive compare in this case, can occur only if there are No Go punches for all three of tests 1, 2 and 4. When the card is scanned with a No Go punch for test 4 to indicate that diode D4 is open, this information will also be printed out in black as it is a "partial compare." In addition, the failure of still other components may be indicated by a No Go for instance of test 1 or tests 1 and 4. When these are scanned, there is also a "partial compare" and the analysis information on these cards is printed out in black. A failure of, for example, tests 2 and 4 may indicate the failure of no specific component and there is, therefore, no analysis card containing this pattern of Go's and No Go's. Nothing is printed out in this case, as partial compare information is printed out in black only when there is an analysis card containing some combination of the No Go test results. For partial compare information printed out the operator can determine the faulty component or components using standard test techniques.

A non-compare occurs whenever there is a No Go punch on an analysis card for which there is no corresponding memory No Go. For instance, let us say that a failure of all four tests 1, 2, 3 and 4 is the No Go pattern on the punched analysis card. There is no corresponding No Go for test 3 in memory. When the punched card bit for test 3 is compared with the memory test result for test 3, there is a non-compare and a signal is sent to the card reader to eject that analysis card at the end of the 20-interval test comparison. It is not possible for the component failure given on that analysis card to be present in the printed circuit board 21 being tested; therefore, the analysis card is ejected and the next analysis card is moved into the read station of the card reader. This permits rapid scanning of the analysis cards.

In the compare section 117 (see FIG. 11) gated odd column (OC) bits from the punched card (P.C.) on line 127 are compared with the even tens (ET) core bits from core memory 95 on line 133. This is because the results of tests 01–09 are in column 3 (an odd column) of the punched analysis card, whereas in the core memory the results of these tests are stored in the upper even tens core plane (test 01 is an even tens test). At the same time, gated EC bits from the punched card on line 129 are compared with OT core bits from core memory on line 131. The comparison of P.C. gated OC bits and ET core bits will be analyzed. An ET core bits signal is inverted by inverter 135 and applied to one terminal of a plus AND circuit 137. The other input of the AND circuit 137 is supplied by the gated OC bits from the punched card. The output of the AND circuit 137 is an input to the OR circuit 139, which when turned on due to the energization of either of its inputs produces a Card No Go equals Memory Go signal ($CNG=MG$). This indicates a non-compare and eventually develops a signal for the card reader to eject that card. Let it be assumed that a core memory No Go and a hole in the punch card (indicating a card No Go) are indicated by positive going signals. Then a Go in memory and the absence of a hole in the punch card will be indicated by negative going signals. If there is a positive going No Go signal on the gated OC bits line, and at the same time a positive going ET core bits signal, the AND circuit 137 will not turn on because the inverter 135 inverts the positive going ET core bits signal to make it a negative-going signal when applied to the input of the AND circuit 137. Thus, there is no $CNG=MG$ signal. In the case that there is a No Go in memory and a Go on the punched card, the negative going Go signal from the punched card does not allow the plus AND circuit 137 to turn on. On the other hand, when there is a Go in memory and a No Go on the punched card, the positive going gated OC bit signal is constantly applied to one terminal of the AND circuit 137. The negative going ET core bits signal is inverted and applied to the other input of the AND circuit 137 as a positive going signal, turning on the AND circuit 137. A $CNG=MG$ signal appears at the output of the OR circuit 139.

Another function of the compare section is to determine whether a compare is an exclusive compare or a partial compare. To do this, the ET core bits signal at the same time is applied without inverting to one input of another plus AND circuit 141. The other input of this AND circuit 141 is provided by the inverted gated OC bits signal. The inversion is performed by inverter 143. The output of the AND circuit 141 provides one of the input terminals to the OR circuit 145 which when turned on produces a Card Go equals Memory No Go signal ($CG=MNG$). This indicates a not exclusive compare, i.e., a partial compare. As will shortly be evident, an exclusive compare does not turn on the OR circuit 145. The $CNG=MG$ line provides color control for the printer 45 by causing it to print out black instead of red in the manner to be explained later. In this portion of the comparing, a No Go on the punched card is inverted by the inverter 143 and applied to the input of the AND circuit 141 as a negative going signal. Thus, the AND circuit 141 does not turn on and there is no output from the OR circuit 145. However, in the case that there is a Go on the punch card and a No Go in memory (positive going ET core bits signal), the negative going gated OC bit is inverted by the inverter 143 and applied to the AND circuit 141 as a positive going signal. Thus, for a Card Go and a Memory No Go, the AND circuit 141 turns on and a $CNG=MG$ output is produced by the OR circuit 145. When there is an exclusive compare, i.e., a No Go on the punched card and a No Go in memory, the AND circuit 141 does not turn on. This is because the positive gated OC bit signal is inverted and applied to the input of the AND circuit 141 as a negative signal.

A similar analysis applies for the comparison of gated EC bits and OT core bits. The OT core bits signals are inverted by an inverter 147 and provide one input to the plus AND circuit 149. The other input of the AND circuit 149 is the uninverted P.C. gated EC bits signal. The output of the AND circuit 149 is the other input to the OR circuit 139. The P.C. gated EC bits signal is simultaneously inverted by the inverter 151 and applied as an input to another plus AND circuit 153. The second input to the AND circuit 153 is the uninverted OT core bits signal, and the output of the AND circuit 153 is applied as one of the inputs of the OR circuit 145. Both sets of data can be compared simultaneously because if either one is a non-compare, it is desired to produce a $CNG=MG$ signal to cause the card to eject. Likewise, if either is a not exclusive compare it is desired to produce a $CG=MNG$ signal to cause the print out in black rather than red.

Figure 12:
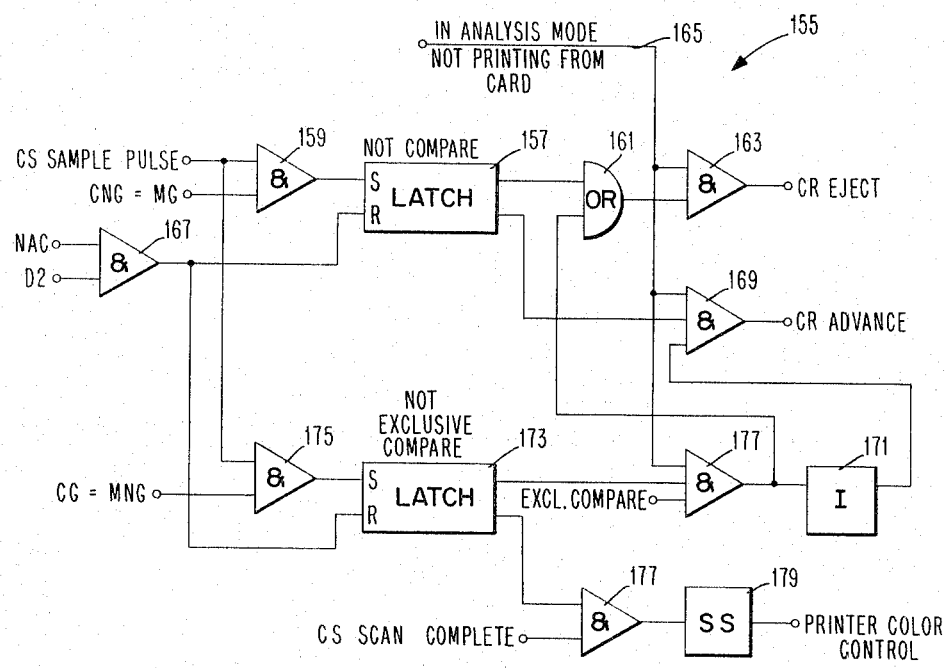
FIG. 12 is a schematic circuit diagram of the compare latches.

The output of the compare section 117 (FIG. 3) is transmitted to the compare latches 155, which are shown in detail in FIG. 12. A not-compare latch 157 is set by the output of an AND circuit 159. The AND circuit 159 is turned on by the coincidence of the Card No Go equals Memory Go signal (from FIG. 11) and the core storage sample pulse. It will be recalled that the memory clock 119 (see FIG. 10) produces a core storage sample pulse (CS sample pulse) which occurs after the information is read out of the magnetic cores 115. The output of the set not-compare latch 157 turns on an OR circuit 161, and this energizes one input of another AND circuit 163. When the logic tester is in analysis mode and is not printing from a punched card as indicated by a signal on the line 165, the AND circuit 163 conducts and produces a card reader eject (CR eject) signal. In essence, when there is a non-compare, the not compare latch 157 is set and the card reader eject signal is developed.

The not compare latch 157 is reset by the output of an AND circuit 167 which is turned on by the coincidence of the new analysis card signal (NAC) appearing at D2 time. The new analysis card signal is produced from punches on each new analysis card. When the not compare latch 157 is reset, the output is applied to an AND circuit 169 which when turned on produces a card reader advance (CR advance) signal which directs the card reader to read the next two columns. In order for the AND circuit 169 to turn on, there must also be a signal over the line 165 indicating that the tester is in analysis mode and not printing from the card, as well as a third signal from the inverter 171 as will be explained later.

A not exclusive compare latch 173 is set when the Card Go equals Memory No Go signal from the compare section 117 is present at the core storage sample pulse time and is gated by the AND circuit 175. The set output of the not exclusive compare latch 173 provides one of the inputs of an AND circuit 177, the other input of this AND circuit being the signal over line 165 and also an exclusive compare signal which for the moment will be considered to be always off.

The not exclusive compare latch 173 is reset when the new analysis card signal appears at D2 time and is gated by the AND circuit 167. The reset output of the not exclusive compare latch 173 is applied to an AND circuit 177 whose output is in turn connected to a single shot 179 for producing a pulse for transmittal to the printer 45 to effect printer color control. That is, when there is an output from the single shot 179, the printer prints in red. This signal, however, can occur only when the scanning of the entire core memory is complete, producing a CS scan complete signal which is required before the AND circuit 177 is energized to produce an output. Thus, it is seen that the not exclusive compare latch 173 is reset at the beginning of the scanning of each new analysis card and remains reset throughout the scanning of the analysis card and comparison with the stored results in the core memory, in which case the analysis information from the punched card is printed out in red. If, during the scanning of the analysis card and comparison with the test results in core memory, there is a $CG=MNG$ signal indicating a partial compare, the latch 173 is set and print out in red is prevented. With the not exclusive compare latch 173 in set condition, the print out is in black. The printer 45 normally prints black unless the single shot 179 directs it to print red.

Because the large percentage of the printed circuit or test boards 21 which are No Go have only one faulty component, the compare latches shown in FIG. 12 can be set up to either eject the card when there is a non-compare or a partial compare and to print out in red when there is an exclusive compare. That is, the partial compare results are not printed out. This can be done simply by energizing the exclusive compare input to the AND circuit 177, by operating a manual control switch on the control panel 39 (FIG. 1). In this case, the output of the AND circuit 177 is applied to the OR circuit 161 which conducts to produce a CR eject signal when the AND circuit 163 turns on in the manner previously described. The result is that when a partial compare is sensed, the not exclusive compare latch 173 is set and the output is gated by the exclusive compare signal to cause the card to be ejected. As a safety measure, the output of the AND circuit 177 is inverted and applied to the AND circuit 169 to make sure that the CR advance signal does not appear at the same time that the CR eject signal is given. By printing out only exclusive compares rapid testing is achieved, since experience has shown that only five percent or fewer of the test boards 21 have more than one faulty component.

If the Go and No Go pattern portion of the analysis card (cols. 3–30) has been completely scanned without the card being ejected due to a non-compare (or a not exclusive compare when in exclusive compare mode), the card reader advances the card to the analysis print out section (cols. 31–60, see FIG. 6). The completion of the scanning of all the cores in core memory turns on a latch not here shown which permits the print information to be gated out of the card reader buffer 65 to the printer 45. In print mode, information is available on the punched card which can be typed out directly. This is conventional and need not be explained further. The last print position is indicated by a special sign punched in the field following the last information to be printed by the typewriter. The analysis card is then ejected and the next analysis card is moved to the read station of the card reader and scanned. After all cards in the analysis deck have been scanned, the last card is indicated by punching similar to that used for indicating the last card of the test deck. This takes the tester out of analysis mode and it begins looking for the test deck first card.

The printer 45 (FIGS. 1 and 3) is preferably an IBM Type 868 Cardatype Transmitting Typewriter. This typewriter features automatic print out color control operated by a magnet. To change from black to red the magnet is energized by the pulse from the single shot 179 (FIG. 12). Upon carriage return following printing in red, another solenoid is pulsed (not here shown) to return the color control to black.

The tester may be program controlled during testing to print out the test numbers which are No Go. This is the normal mode of operation as it is useful for the operator to have a record of No Go tests, particularly if there is a partial compare. The test number information from the last ten bits of the 70 bit latch buffer 73 (FIG. 3) is transmitted to the printer 45 during testing. If the test at D6 time is No Go, a print instruction is sent to the typewriter clock, not here shown, to print out the test number which failed. The test number actually taking place may also be displayed visually to the operator on a test number display section 181 on the console control panel 39 (FIG. 1).

*Summary of operation*

The more basic steps in the operation of the logic tester will be reviewed. The printed circuit board 21 shown in FIG. 2 is a typical high-density electronic package which can be tested by the present logic tester. As an example of the logic circuits which may be packaged on the board 21, it may include five three-way plus AND invert circuits of the type shown in FIG. 4 and two similar 2-way plus AND invert circuits. In accordance with the invention, faulty components in any of the circuits are located by the method of checking each output individually by applying all minimized logical combinations that affect the particular output. Other special tests may be made to test for excessive voltage swings, to apply loads to outputs, and to check the land pattern on a printed circuit board and also jumper wires for opens and shorts. For example, the logic circuit of FIG. 4 requires seven different tests to completely analyze the circuit and particularly locate any faulty component. From each test there is a single Go or No Go result.

Referring to FIGS. 1 and 3, to begin the test the proper master program board 43 is placed in the receptacle on the console unit 33 to modify the drivers 77 to provide the proper voltage swings and impedances for the type of logic being tested. A program board 41 is placed in its receptacle on the console 33 for the particular part number of the printed circuit board 21 being tested. The program board 41 connects the proper drivers 77 to the input pins 31 of the test board 21 and the level detectors 83 to the proper test board output pins. Also, loads 81 can be programmed for the test board outputs, voltage sequencing for the power supplies 87 can be programmed for connection to the proper pins on the test board, and reference voltage dividers 89 for the level detectors can be programmed, etc.

A test deck and an analysis deck of punched record cards are placed in the hopper of the card reader 37 for the particular printed circuit board 21 being tested. A test card (see FIG. 5) has stored punched information for selecting the program control, and the particular drivers 77, the particular load switch 81, and the level detector 83 which is required for that particular test. It also contains test number information for supplying the address to the core memory 95, for visual display on the control panel 39, and for printing out the No Go test numbers as the test proceeds. The format for punching this information in the card was given previously. The card reader 37 is initially loaded by the operator by manual control, and the card reader proceeds to automatically look for the first card of the test deck which is designated by a unit zero punched in the test number section of the card.

After locating the first card, functioning of the tester ceases until a test board 21 is plugged into the test socket in the table of the console unit 33. This is sensed by a microswitch in the socket (not here shown) and the socket is caused to close to clamp the card and connect with tab pins 31. The complete closing of the socket causes another microswitch (not here shown) to close, initiating the sequencing of the relay circuit 92 to apply the selected power supplies to the appropriate tab pins on the test board 21. The closure of the last relay of the relay circuit 92 sends a card reader read signal (CR read) to the card reader 37. The test deck first card signal is also applied to the No Go register 111 (FIG. 8) to transmit a Go bit to the core memory 95. At the same time the core memory clock 119 (FIG. 10) is turned on and automatic scanning of the magnetic cores 115 (FIG. 9) in core memory commences to write Go in each core in the core memory. Thus it is assured that any No Go's from any previous tests are removed.

The card reader 37 now begins to read two adjacent punched card columns at a time, these 24 bits being stored in the card reader 65. Of these 24 bits, two bits go to the program control section 67 to indicate to the tester the start of a new test and whether the deck is an analysis or test deck. Another two bits provide parity information for the card reader and are not used by the tester. The remaining 20 bits are available to be read out through a column counter 71 into the appropriate section of the 70 bit latch buffer 73. As many as 70 bits of information may be required to program one test.

When the card reader buffer 65 is filled for the first time when a new test is made, it sends a buffer ready signal to the digit clock 69 to start the clock going. At time D1 the column counter 71 is reset to the C1 position and the first 20 bits from the card reader buffer 65 are entered into latches 0–19 of the latch buffer 73. The card reader 37 then advances automatically to read the next two columns of information into the card reader buffer 65. At time C2 the next 20 bits are gated by the column counter 71 into latches 20–39 of the 70 bit latch buffer 73. At C3 time the next 20 latches are filled up, and at C4 time the remaining 10 latches are set if so directed by the punched information on the test card. An important function of the latch buffer 73 is to provide memory between tests. This is especially the case when testing sequential circuits, as it is then imperative that the drivers 77 which are connected to the inputs of the test board 21 are not changed between tests. The filling up of the latch buffer 73 occurs at D2 to D4 time, and time D5 is a waiting period and is used when making special tests such as a scope test.

Of the 70 bits in the latch buffer 73, thirteen bits provide information for the program control 67, 30 bits select the particular drivers 77 which are to be used, another five bits make the selection of the desired load switch 81, twelve bits provide for the selection of the appropriate level detector 83, and the remaining ten bits provide test number information to be sent to the core memory 95 to provide an address when writing in the test results.

The level detectors 83 operate by comparing the unknown test voltage with a reference voltage set on the selected voltage divider 89. A Go or a No Go test results signal is obtained for each test. If the test result is a No Go, the No Go bit is gated at D6 time (see FIG. 8) through the AND circuit 109 to set the No Go register or latch 111. At D7 time the No Go bit is gated by the AND circuit 113 to the core memory 95 to control the inhibit line or lines thereof. In a manner well-known in the art, the No Go test results are written into the core memory 95, see FIG. 9. During writing into core memory 95, the test number information from the latch buffer 73 provides the address by selecting the proper X and Y lines. Since all the cores 115 were originally in the Go magnetic state, the writing in of a No Go test result involves switching the magnetic state of the core. As has been explained, the magnetic cores 115 are arranged in two planes, each having columns and rows similar to a punched record card. The various test results are entered into the cores in the sequence shown in FIG. 9 wherein tests 01–09 are entered into the first column of the upper core plane, the results of tests 10–19 are entered into the first column of the lower core plane, and so on. Even tens test results are in the upper core plane while odd tens test results are in the lower core plane. At the end of the series of tests on the test board 21, the core memory 95 has a Go and No Go pattern corresponding to that of the various test results.

The master or cumulative No Go latch 119 (FIG. 3) is set at D6 time whenever at least one of the test results is a No Go. The test complete signal is ANDed with this output from the No Go latch 119 to provide a signal 123 which prevents ejection of the first card of the analysis deck by the card reader. The test complete signal is also used to initiate disconnection of the power supplies 87 from the test board 21 by energizing the relay circuit 92. The test socket is then opened automatically and the test board 21 at this time may be removed. When the last of the relays has opened, a card reader eject (CR eject) command is sent to the card reader 37 to eject the last test card and start to hunt for the first card in the analysis deck. When this card is found (it should be the next card after the last card of the test deck), the tester goes into analysis mode.

The first card of the analysis deck is ejected automatically and scanning of the analysis deck begins. From the sample analysis card shown in FIG. 6, it is seen that columns 3–30 of each analysis card contain the Go and No Go pattern of test results which would result if a particular component or logic block were faulty. There is a punch position for each test result, the No Go's being indicated or stored by a punch at the corresponding test position. Two columns of the punch card are scanned at the same time, corresponding to the results of tests 00–19. These 20 bits are loaded into the card reader buffer 65 and transmitted to the compare section 117 through a gating circuit 125 which gates out the punched card odd and even column bits in synchronization with the scanning of the corresponding tests in core memory. The test results which are scanned out of the first column of the upper odd tens core plane and the lower even tens core plane are subsequently written back into the core memory so that the Go and No Go test results pattern is available when the next analysis card is read and compared with the corresponding information in core memory. This is called a non-destructive memory.

In the compare section 117 (FIG. 11) the punched card gated odd column bits on line 127 are compared with the memory even tens core bits on line 133. At the same time the punch card gated even column bits on line 129 are compared with the memory odd tens core bits on line 131. That is the core memory test 0 and test 10 are compared against the two corresponding tests on the punch card at the same time. Then test 1 and test 11 from memory are compared with their corresponding bits on the punched card, and so on. The tests are compared serially in numerical sequence, two bits per memory clock cycle. The compare section 117 has two functions: to determine if there is compare or a non-compare; and to determine if the compare is an exclusive compare or partial compare.

A non-compare signal appears at the output of the OR circuit 139 and occurs whenever there is a card No Go at the same time that there is a memory Go. In other words, when there is a No Go on the punched card which is not in the memory, the $CNG=MG$ signal is produced and results in the ejection of that analysis card from the card reader, since the component represented by that analysis card could not be bad. A not exclusive compare, i.e., a partial compare, is sensed when the OR circuit 145 is turned on to produce a $CG=MNG$ signal. A partial compare allows additional No Go's in memory as against those in the analysis card pattern since the additional No Go's could be caused by additional component or logic block failures on the same test board 21. There is a partial compare when there is a card Go when the corresponding test in memory is No Go. An exclusive compare does not energize the OR circuit 145 since there is a punch card No Go being compared with a memory No Go.

The non-compare signal $CNG=MG$ is gated through the AND circuit 159 (FIG. 12) when the core storage sample pulse is being generated to set the not compare latch 157. The set output of the latch 157 is gated through the OR circuit 161 and also through the AND circuit 163 when the tester is in analysis mode and not printing from the card, to produce a card reader eject output which causes the card reader 37 to move the next analysis card to the read station. If the non-compare latch 157 remains reset after the comparison of the first 20 tests, the reset output produces a card reader advance signal at the output of the AND circuit 169. The card reader then reads the next two columns of information and the results of these next 20 punched card tests are compared with the corresponding bits from the core memory. If a non-compare is not found, comparison of test results proceeds by 20 test intervals until all of the tests have been compared.

When the not exclusive compare signal $CG=MNG$ is produced anywhere during the testing, it is gated through the AND circuit 175 when the core storage sample pulse appears and sets the not exclusive compare latch 173. Normally this not exclusive compare latch 173 is in the reset condition, in which case when all the tests have been compared and the core storage scan complete signal appears, the single shot 179 produces a pulse which is transmitted to the printer 45 to set the printer color control to print in red. If the not exclusive compare latch 173 is set while comparing, the single shot 179 is not energized and the printer prints in black. Partial compare results are printed out in black whereas exclusive results are printed out in red.

Should all the tests on the punched analysis card be compared with the corresponding tests in core memory without sensing a non-compare which causes the card reader to eject the card, the tester goes into print mode and prints out all of the information from the analysis print-out section (cols. 31–60) of the punched card. On each analysis card the last print position is indicated by a special punching in the field following the last information to be printed by the typewriter 45. The analysis card is then ejected and the next analysis card is scanned. After all cards in the analysis deck have been scanned, the last card is indicated by special punching. This takes the tester out of the analysis mode and begins looking for the test deck first card.

The operator now has a printed out record of the exclusive compares which are printed in red and the partial compares which are printed in black. He may also have a printing out in the manner previously explained of the test numbers which are No Go. With this information, faulty components on the test board 21 can be located by an unskilled operator using standard techniques.

Logic circuits packaged in other ways than by using the printed circuit board 21 which has been described may be tested using the logic tester according to the invention. For example, miniaturized logic circuits comprising chip transistors and diodes attached to an insulating substrate and interconnected by painted on printed circuit lines and capacitors and resistors and the like may be tested. Furthermore, although the use of a punched card reader in the tester has been described as being the preferred embodiment, it can be replaced by and the same principles applied in using a tape reader, core or disc file memory test and analysis. More rapid testing can be achieved by reading the punched card or magnetic tape test and analysis information into a core or disc file memory, the information being scanned out of memory at very high speeds as the testing proceeds. This is advantageous when testing large quantities of the same part number.

The advantages of the present logic tester in permitting high automatic testing by an unskilled operator have been mentioned previously. Another advantage is that it is possible to use computer generated test and analysis information derived from design automation groups. The tester lends itself to rapid change of programming due to engineering change activity. Furthermore, new techniques in the state of computer generated test and analysis art can be quickly applied.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An automatic logic tester for sequentially testing logic circuits for faulty components, each of the logic circuits having at least one input and an output, said tester comprising
test record means for storing test information for programming a series of tests which apply all minimized logical input combinations to the inputs of said logic circuits and make other tests as are necessary to determine the identity of faulty components,
analysis record means for storing Go and No Go patterns of analysis test results which would occur for the failure of different components in the test logic circuits,
means for selectively reading said test information and analysis record means,
means including means responsive to the read test information for energizing the logic circuits sequentially and for detecting a Go and No Go result for each of the tests,
a memory including at least one bi-stable storage element for storing the detected test results in a defined sequence, to provide a pattern of the detected test results which is indicative of the failure of at least one of the components in the logic circuits,
means for comparing the Go and No Go patterns of analysis test results on the analysis record means with the detected test results in said memory and providing a signal in the event of a compare, and
means actuated by the compare signal for providing a visual indication of the faulty components.

2. A construction as defined in claim 1 wherein said analysis record means includes a Go and No Go pattern of analysis test results which would occur for the failure of each of the components in the test logic circuits, and wherein said comparing means includes a circuit for determining a non-compare and for signalling ejection of the corresponding pattern of Go and No Go analysis test results from said reading means.

3. An automatic logic tester for sequentially testing logic circuits for faulty components, each of the logic circuits having at least one input and an output, said tester comprising
a deck of test cards having punched test information for programming a series of tests which apply logical input combinations to the inputs of said logic circuits and make other tests as are necessary to determine the identity of faulty components,
a deck of analysis cards each containing a punched pattern of Go and No Go analysis test results which would occur for the failure of each of the components in the logic circuits,
means for selectively reading said test cards and said analysis cards,
means including means responsive to the read test information for energizing the logic circuits sequentially and for detecting a Go or No Go result for each of the tests,
a memory including storage elements for storing the detected test results in a defined sequence,
means for comparing the Go and No Go patterns of analysis test results on the analysis cards with the detected test results in said memory and providing a signal in the event of a compare,
and means responsive to the compare signal for printing out the identity of components on which there is a compare.

4. A construction as defined in claim 3 wherein said comparing means includes circuit means for determining whether a compare is an exclusive compare or a partial compare and for controlling said printing means to print out an exclusive compare in one color and a partial compare in another color.

5. A construction as defined in claim 3 wherein said comparing means includes circuit means for determining whether there is a compare or a non-compare and whether a compare is an exclusive compare or a partial compare,
said comparing means further including means for controlling said printing means to print an exclusive compare in one color and a partial compare in another color and also including means for signalling ejection of the analysis card from said reading means when there is a non-compare.

6. An automatic logic tester for sequentially testing logic circuits for faulty components, said tester comprising
test record means for storing test information for programming a series of tests which apply all minimized logical input combinations and make other special tests as are necessary to determine the identity of faulty components in the logic circuits,
analysis record means for storing a plurality of patterns of Go and No Go analysis test results which would occur for the failure of each of the components in the logic circuits,
means for selectively reading said test record means and said analysis record means,
means including means responsive to the read test information for energizing the logic circuits sequentially and for detecting a Go and No Go test result for each of the tests, a non-destructive memory for storing the detected test results in a defined sequence, said memory including bi-stable elements for storing the detected Go or No Go result of each of the tests, means for simultaneously comparing a plurality of the detected test results in said memory against the corresponding Go and No Go analysis test results on said analysis record means, and means for providing an indication of a compare and for identifying a faulty component.

7. A method of testing a logic circuit for faulty components comprising the steps of storing a program of a series of tests for sequentially applying various logical input combinations to the logic circuit and making other tests as are necessary to determine the identity of selected faulty components, energizing the logic circuit sequentially in accordance with said program, detecting a test result for each of said tests, storing said detected test results in a non-destructive memory in a defined sequence to provide a pattern of the detected test results which is indicative of the failure of at least one of the components in the logic circuit, storing a plurality of patterns of analysis test results which would occur for the failure of each of the selected logic circuit components, and sequentially comparing the pattern of detected test results in said memory with the patterns of analysis test results to determine the identity of the faulty components.

8. A method of testing logic circuits for faulty components comprising the steps of storing on test record means a program of a series of tests for sequentially applying various logical input combinations to the logic circuits and making other tests as are necessary to determine the identity of selected faulty components, energizing the logic circuits sequentially in accordance with said program, detecting a test result for each of said tests, storing said detected test results in a memory in a defined sequence to provide a pattern of the detected test results which is indicative of the failure of at least one of the components in the logic circuit, storing on analysis record means a plurality of patterns of analysis test results which would occur for the failure of each of the selected logic circuit components, sequentially comparing the pattern of detected test results in said memory with the patterns of analysis test results on said analysis record means to determine whether there is a compare or a non-compare, and making a visual record of compare information to identify the faulty components.

9. A method of testing logic circuits for faulty components comprising the steps of applying all minimized input logical combinations to said logic circuits and making other tests as are necessary to determine the identity of faulty components, detecting a Go or No Go test result for each of said tests, storing said detected test results in a memory in a defined sequence, said memory including a bi-stable element for each of said detected test results to provide a pattern of Go's and No Go's which is indicative of the failure of at least one of the components in the logic circuits, storing a plurality of patterns of Go and No Go analysis test results which would occur for the failure of each of the components in the logic circuits, and comparing the detected test results in said memory with the pattern of Go and No Go analysis test results which would occur for the failure of each of the components to determine the identity of faulty components.

10. A method of testing logic circuits for faulty components comprising the steps of preparing a program of a series of tests for sequentially applying various logical input combinations to the logic circuits and making other tests as are necessary to determine the identity of selected faulty components, energizing the logic circuits sequentially in accordance with said program, detecting a Go or No Go test result for each of said tests, storing said test results in a non-destructive memory in a defined sequence to provide a pattern of Go's and No Go's which is indicative of a failure of at least one of the components in the logic circuits, storing a plurality of patterns of Go and No Go analysis test results which would occur for the failure of each of the selected logic circuit components, sequentially comparing the detected test results in said memory with the patterns of Go and No Go analysis test results to identify the faulty components, and making a visual indication of the identity of the faulty components.

References Cited by the Examiner
UNITED STATES PATENTS

| | | | |
|---|---|---|---|
| 2,963,652 | 12/1960 | Taylor | 324—73 X |
| 3,179,883 | 4/1965 | Farrow | 324—73 |
| 3,219,927 | 11/1965 | Topp | 324—73 |

References Cited by the Applicant
UNITED STATES PATENTS

| | | |
|---|---|---|
| 2,798,199 | 7/1957 | Potter. |
| 3,000,003 | 9/1961 | Einsel. |

WALTER L. CARLSON, *Primary Examiner.*

E. L. STOLARUN, *Assistant Examiner.*